(12) United States Patent
Farhan et al.

(10) Patent No.: US 7,774,525 B2
(45) Date of Patent: Aug. 10, 2010

(54) ZONED INITIALIZATION OF A SOLID STATE DRIVE

(75) Inventors: Munif M. Farhan, Round Rock, TX (US); Thomas L. Pratt, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 72 days.

(21) Appl. No.: 11/685,499

(22) Filed: Mar. 13, 2007

(65) Prior Publication Data

US 2008/0228997 A1 Sep. 18, 2008

(51) Int. Cl.
G06F 3/00 (2006.01)
G06F 13/12 (2006.01)
G06F 12/00 (2006.01)

(52) U.S. Cl. .......................... 710/74; 710/10; 711/129; 711/153; 711/173

(58) Field of Classification Search .................. 710/74, 710/10; 711/129, 153, 173
See application file for complete search history.

(56) References Cited

U.S. PATENT DOCUMENTS

| 7,017,037 | B2 | 3/2006 | Fortin et al. |
| 7,100,040 | B2 | 8/2006 | Fortin et al. |
| 7,107,440 | B2 | 9/2006 | Rothman et al. |
| 2002/0124165 | A1* | 9/2002 | Smith et al. .................. 713/2 |
| 2006/0085493 | A1* | 4/2006 | Kim et al. .................. 707/206 |
| 2007/0271348 | A1* | 11/2007 | Yang .......................... 709/206 |
| 2008/0123491 | A1* | 5/2008 | Park et al. .................. 369/53.2 |
| 2008/0172519 | A1* | 7/2008 | Shmulevich et al. ........ 711/103 |

* cited by examiner

Primary Examiner—Niketa I Patel
(74) Attorney, Agent, or Firm—Haynes and Boone, LLP

(57) ABSTRACT

Zoned initialization of a solid state drive is provided. A solid state memory device includes a controller for controlling storage and retrieval of data to and from the device. A set of solid state memory components electrically coupled to the controller. The set is electrically divided into a first zone and a second zone, wherein the first zone is at least partially initialized independent from the second zone. An interface is coupled between the controller and the set of solid state memory components to facilitate transfer of data between the set of solid state memory components and the controller.

23 Claims, 3 Drawing Sheets

US 7,774,525 B2

ZONED INITIALIZATION OF A SOLID STATE DRIVE

BACKGROUND

The present disclosure relates generally to information handling systems, and more particularly to initializing solid state memory for an information handling system.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Solid state drives (SSDs) are becoming more popular and nearing adoption as mainstream data storage devices for the PC and notebook markets. The SSDs use solid state memory devices, such as flash memory or the like, for data storage. The SSDs have performance advantages over traditional electro-mechanical magnetic hard disk drives (HDDs) due to very low data access times, low power consumption, and no moving mechanical parts.

A problem with SSDs is that with current technologies, if a user wants to create an SSD with, for example, a 32 GB capacity, the device must be created by integrating sixteen 2 GB capacity components together. At power up for the IHS, the SSDs must initialize or "wake-up" each of the components serially in order to create a defect table and to gather other information required for proper wear leveling and management of the memory devices. This serial initialization of all the components can take several seconds due to the number of individual components integrated together to obtain the desired SSD capacity. As a result, IHS operating system boot-up or resume time is negatively impacted.

To combat this slow initialization time, others have limited the number of flash-type components in the SSD. However, this limits capacity and decreases read/write performance. Another response to this problem is to create a hybrid HDD. These systems use solid state flash-type components in conjunction with traditional magnetic HDD media. The small amount of solid state components in this hybrid can lower boot/resume times and save power, but this also limits flexibility in solid state media capacity and adds significant complexity to the HDD system. In addition, these hybrid drives do not provide the shock and vibration robustness that a pure solid state device can.

Accordingly, it would be desirable to provide for initializing solid state memory absent the disadvantages found in the prior methods discussed above.

SUMMARY

According to one embodiment, the present disclosure relates to initializing solid state memory. A solid state memory device includes a controller for controlling storage and retrieval of data to and from the device, and a set of solid state memory components electrically coupled to the controller. The set is electrically divided into a first zone and a second zone, wherein the first zone is at least partially initialized independent from the second zone. An interface is coupled between the controller and the set of solid state memory components to facilitate transfer of data between the set of solid state memory components and the controller.

DETAILED DESCRIPTION

For purposes of this disclosure, an IHS includes any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a personal computer, a network storage device, or any other suitable device and may vary in size, shape, performance, functionality, and price. The IHS may include random access memory (RAM), one or more processing resources such as a central processing unit (CPU) or hardware or software control logic, read only memory (ROM), and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit communications between the various hardware components.

Figure 1:
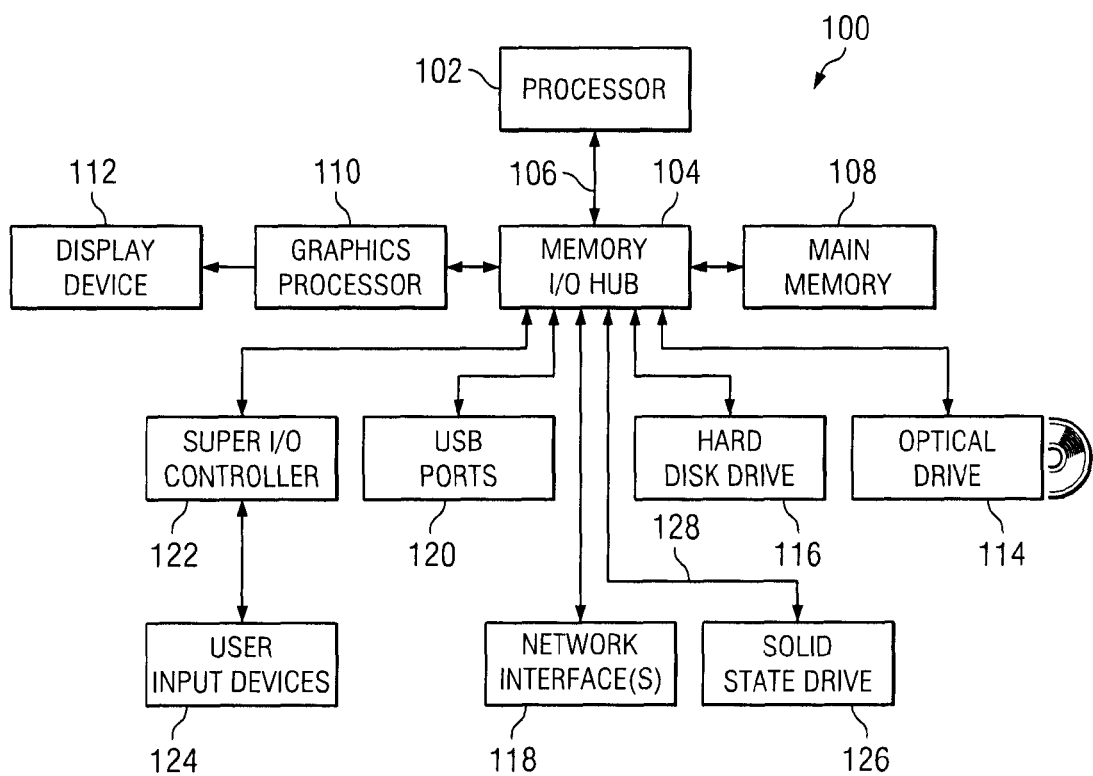
FIG. 1 is a block diagram illustrating an embodiment of an IHS.

FIG. 1 is a block diagram of one IHS. The IHS 100 includes a processor 102 such as an Intel Pentium series processor or any other processor available. A memory I/O hub chipset 104 (comprising one or more integrated circuits) connects to processor 102 over a front-side bus 106. Memory I/O hub 104 provides the processor 102 with access to a variety of resources. Main memory 108 connects to memory I/O hub 104 over a memory or data bus. A graphics processor 110 also connects to memory I/O hub 104, allowing the graphics processor to communicate, e.g., with processor 102 and main memory 108. Graphics processor 110, in turn, provides display signals to a display device 112.

Figure 2:
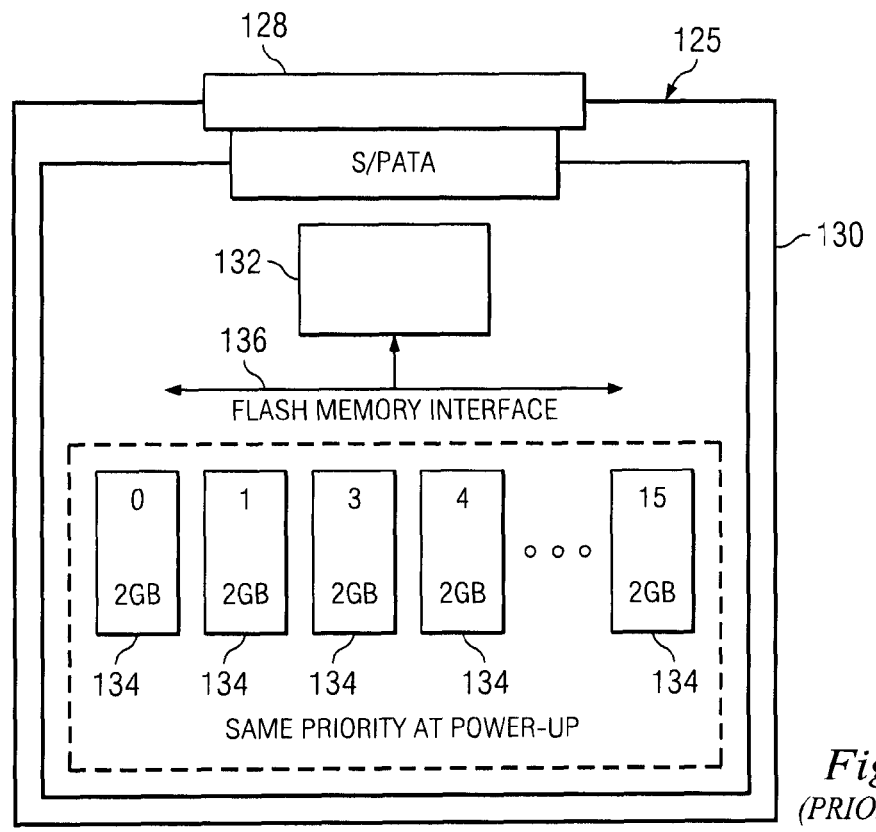
FIG. 2 is a block diagram illustrating an embodiment of a prior art solid state drive for an IHS.

Other resources can also be coupled to the system through memory I/O hub 104 using a data bus, including an optical drive 114 or other removable-media drive, one or more hard disk drives 116, one or more network interfaces 118, one or more Universal Serial Bus (USB) ports 120, and a super I/O controller 122 to provide access to user input devices 124, etc. It is also becoming feasible to use solid state drives (SSDs) 125, as shown in FIG. 2, in place of, or in addition to main memory 108 and/or a hard disk drive 116. The SSD 125 is generally coupled with the memory I/O hub 104 using a serial or parallel data bus 128.

Not all IHSs include each of the components shown in FIG. 1, and other components not shown may exist. Furthermore, some components shown as separate may exist in an integrated package or be integrated in a common integrated circuit with other components. As can be appreciated, many systems are expandable, and include or can include a variety of components, including redundant or parallel resources.

Figure 3:
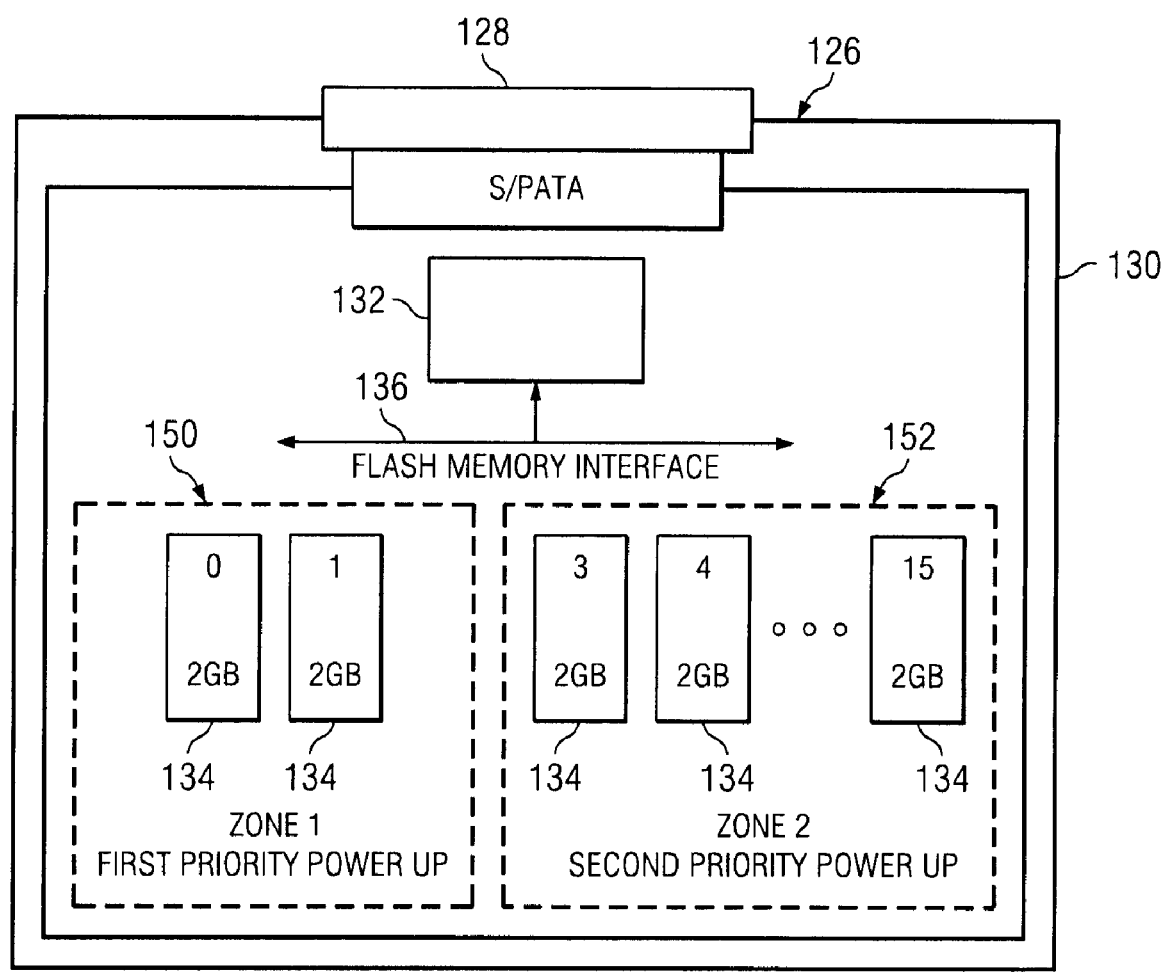
FIG. 3 is a block diagram illustrating an embodiment of a solid state drive for an IHS.

FIG. 3 shows an embodiment of a solid state drive 126. This SSD 126 connects to the memory I/O hub 104 of an IHS 100 via a bus 128 to transfer data between the Memory I/O hub 104 and the SSD 126. The data bus 128 can be either a serial or parallel bus transferring the data as electrical signals. In addition, the bus 128 can transfer data using fiber optic, wireless or other types of data transmission. An SSD package 130 supports the SSD while allowing connections to the SSD from other components of the IHS 100. Any type of package 130 can be used with the SSD 126.

To control operation of the SSD 126, a controller, processor, or set of such devices (collectively called a chipset) 132 handles the initialization, storage and retrieval of data, and maintenance for the SSD 126 as commonly understood in the art. Some of these functions may alternatively be handled by other components outside the SSD. Interfacing between the chipset 132 and the memory I/O hub 104 is accomplished via the data bus 128. Interfacing between the chipset 132 and a set of solid state memory components 134 is accomplished via an internal interface 136. As shown in FIG. 3, the interface 136 is a flash memory interface. However, other types of interface 136 can be used to accomplish communication between the chipset 132 and the memory components 134.

The SSDs 126 are built using multiple solid state memory components 134, such as, but not limited to flash memory components. To create the desired capacity of SSD, a number of available sizes of memory components 134 are coupled together. For example, if a 32 GB capacity drive is desired, the SSD 126 can be constructed using sixteen 2 GB capacity components 134. In this way, any size of SSD 126 can be accomplished. However, because the memory components 134 are generally initialized serially to create a defect table and/or other maintenance functions, the more memory components 134 that are built into the SSD 126, the longer the amount of time the SSD 126 takes to initialize before the SSD 126 can be used by the IHS 100. To improve upon this, one embodiment of a zoned initialization of a solid state drive creates multiple initialization zones 150, 152 for the memory components 134. Any number of zones 150, 152 can be used for initializing the memory components 134 and the zones 150, 152 can be any capacity.

Referring to an embodiment shown in FIG. 3, the first priority zone 150, is a smaller capacity zone than the second priority zone 152. Thus, the first priority zone 150 completes initialization before the second priority zone 152 and is ready for use by the IHS 100 before the second priority zone 152. This allows the IHS 100 to shorten start-up or boot-up time. The zones 150, 152 can be any size relative to one another and can be initializing simultaneously or in parallel, so long as one zone is initialized independently of the other. Once the initialization period is completed for the SSD 126, the operation of data storage/retrieval can be handled as necessary for the given application.

The IHS 100 will communicate with the SSD 126 during the power-up phase allowing the operating system for the IHS 100 to access whatever data is needed by the operation system to complete start-up. For example, the SSD 126 may store application data which would not be needed until start-up is completed. On the other hand, the SSD 126 may store all or a portion of the operating system itself and further reduce the start-up time for the IHS 100 by having the operating system data available to the processor 102 quicker.

Figure 4:
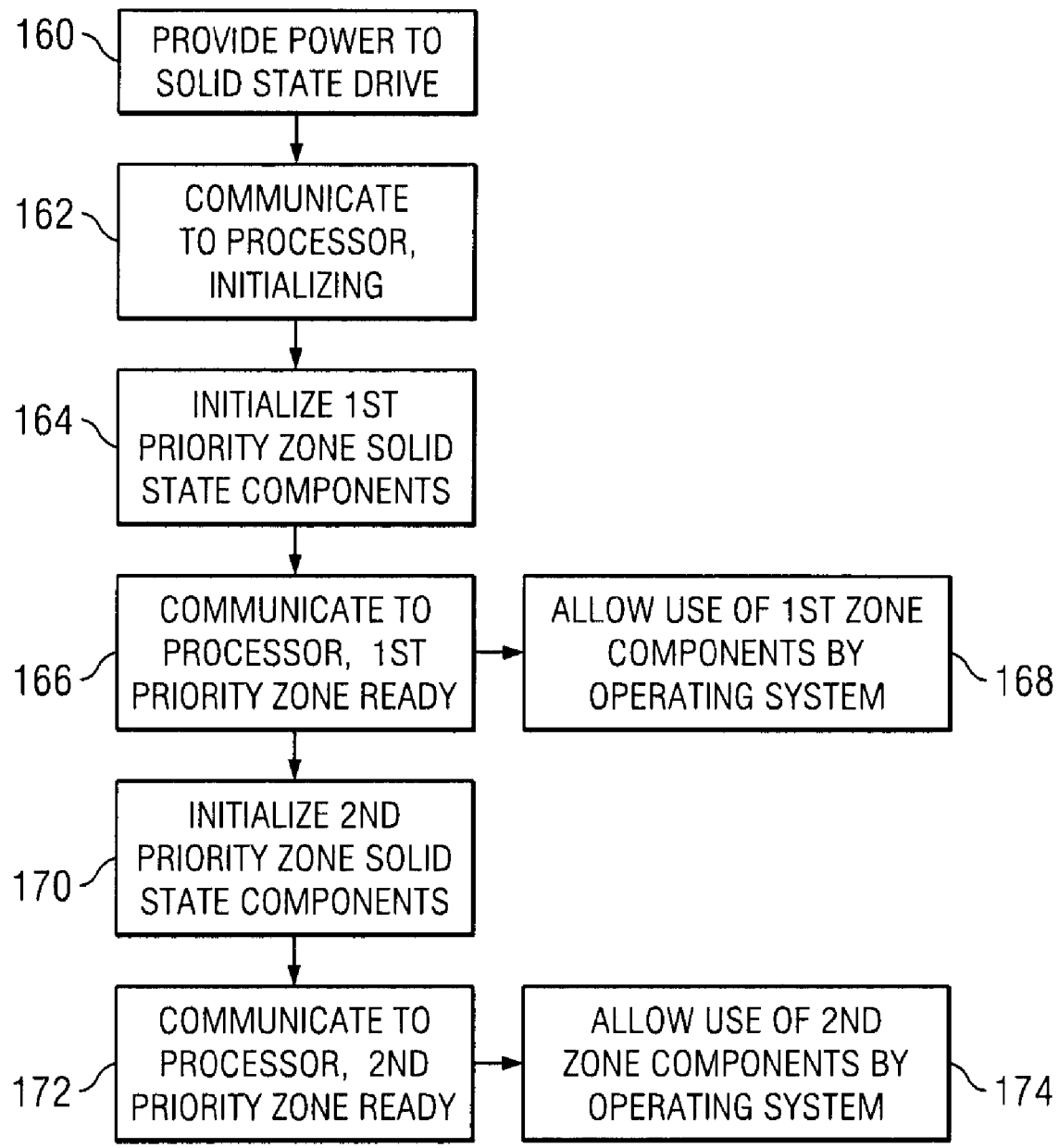
FIG. 4 is a block diagram illustrating an embodiment of a method of initializing a solid state drive.

FIG. 4 shows one embodiment of a method of initializing an SSD 126. Upon start-up of the IHS 100, electrical power is provided to SSD 126 at 160. The SSD 126 communicates to the processor 102 that the SSD 126 is initializing 162. At this point, initialization of the first priority zone 150 commences 164. Once the first priority zone 150 is fully initialized, the SSD 126 communicates to the processor 102 that the first priority zone 150 of the SSD 126 is ready for use 166 and use of the first priority zone 150 memory components 134 is allowed 168. At some point, before, during or after beginning initialization of the first priority zone 150, initialization of the second priority zone memory components 134 commences 170. Once the second priority zone 152 initialization is complete, the SSD 126 communicates to the processor 102 that the second priority zone 152 is ready for use 172. Use of the second priority zone 152 is then allowed 174. There can be any number of priority zones and there can be any order of beginning initialization for the priority zones so long as the first zone is initialized independently of the second zone.

In addition to performing zoned initialization of SSDs 126 for decreased start-up times, zoned initialization may be used any other reason. For example, zoned initialization of the SSD 126 may be performed to allow different types of solid state memory components 134 to be used in the same SSD 126. This may be desired when different reliability or robustness of solid state memory components 134 are needed to meet design specifications. As a result, the different solid state memory components 134 could be initialized in a zoned initialization with different reliability, performance or initialization requirements. Furthermore, different timing situations may benefit from zoned initialization of solid state memory components 134 in SSD's 126. Thus, this application contemplates other uses of zoned initialization of SSDs. Therefore, independent initialization can account for different timing of zoned initialization, different rules of zoned initialization, or other differences as desired.

In summary, an embodiment of the SSD 126 divides the solid state memory components 134 into two zones 150, 151 with different power-up initialization sequences for reasons such as performance or reliability. A first priority zone 150 of flash or other solid state memory is initialized independently of the remaining components. In one embodiment, the first priority zone 150 has a relatively small amount of flash memory and is used similarly to the flash component 134 of a hybrid HDD. The smaller amount of flash memory is initialized in a short amount of time and provides benefits similar to the benefits associated with the Microsoft Windows® Vista™ operating system's ReadyDrive™ and/or ReadyBoost™ features while the remaining zone's 152 flash components 134 are initializing. As a result, the SSD 126 can identify itself to the Vista™ or other software operating system as a hybrid HDD to take advantage of the ReadyDrive™ and/or Ready Boost™ features. Alternatively, the entire operating system for an IHS 100 can be loaded into a higher priority solid state or flash zone 150 of the SSD 126 in order to improve start-up or boot-up time. In this case, the first priority zone 150 would need to have a large enough memory capacity to accommodate the entire operating system for the IHS 100.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A solid state memory device comprising:
   a controller for controlling storage and retrieval of data to and from the solid state memory device;
   a plurality of solid state memory components coupled to the controller, wherein the plurality of solid state memory components are divided into a first priority zone and a second priority zone that comprises a larger memory capacity than the first priority zone, and wherein, in response to a start-up of an information handling system that is coupled to the plurality of solid state memory components, the first priority zone is at least partially initialized independent from the second priority zone such that the first priority zone completes initialization before the second priority zone and is ready for use before the second priority zone; and
   an interface between the controller and the plurality of solid state memory components to facilitate transfer of data between the plurality of solid state memory components and the controller.

2. The memory device of claim 1 wherein the solid state memory device is held within a package and further comprises a bus for connecting to other electrical components.

3. The memory device of claim 1 wherein the interface between the controller and the plurality of solid state memory components is a flash memory interface.

4. The memory device of claim 1 wherein the plurality of solid state memory components are flash-type memory.

5. The memory device of claim 1 wherein the plurality of solid state memory components are initialized serially for building a defect table or other maintenance function about the plurality of solid state memory components.

6. The memory device of claim 1 wherein the solid state memory device identifies itself to other components as a hybrid hard disk drive.

7. The memory device of claim 1 wherein the first priority zone comprises an operating system for the information handling system that is coupled to the plurality of solid state memory components.

8. The memory device of claim 1 wherein the first priority zone is at least partially initialized before the second priority zone such that the first priority zone may be utilized for data before the second priority zone.

9. An information handling system (IHS) comprising:
   a processor;
   a solid state memory device coupled to the processor, the solid state memory device including: a controller for controlling storage and retrieval of data to and from the solid state memory device;
   a plurality of solid state memory components coupled to the controller, wherein the plurality of solid state memory components are divided into a first priority zone and a second priority zone that comprises a larger memory capacity than the first priority zone, and wherein, in response to a start-up of the IHS, the first priority zone is at least partially initialized independent from the second priority zone such that the first priority zone completes initialization before the second priority zone and is ready for use before the second priority zone; and
   an interface between the controller and the plurality of solid state memory components to facilitate transfer of data between the plurality of solid state memory components and the controller.

10. The IHS of claim 9 wherein the interface between the controller and the plurality of solid state memory components is a flash memory interface.

11. The IHS of claim 9 wherein the plurality of solid state memory components are flash-type memory.

12. The IHS of claim 9 wherein the plurality of solid state memory components are initialized serially for building a defect table or other maintenance function about the plurality of solid state memory components.

13. The IHS of claim 9 wherein the solid state memory device identifies itself to other components as a hybrid hard disk drive.

14. The IHS of claim 9 wherein the first priority zone comprises an operating system for the IHS.

15. The IHS of claim 9 wherein the first priority zone is at least partially initialized before the second priority zone such that the first priority zone may be utilized for data before the second priority zone.

16. A method of initializing a solid state memory device for an IHS comprising:
   providing electrical power to the solid state memory device that comprises a plurality of solid state memory components that are divided into a first priority zone and a second priority zone that comprises a larger memory capacity than the first priority zone;
   initializing the first priority zone in response to a start-up of the IHS;
   initializing the second priority zone independent of the initialization of the first priority zone, wherein the initialization of the first priority zone independent of the second priority zone results in the first priority zone completing initialization before the second priority zone such that the first priority zone is ready for use before the second priority zone; and
   allowing use of the first priority zone and the second priority zone for data transfer.

17. The method of claim 16 further comprising building a defect table or other maintenance function for the solid state memory device to avoid using defective sections of the solid state memory device.

18. The method of claim 16 further comprising identifying the solid state memory device as a hybrid disk drive to an operating system of the IHS.

19. The method of claim 16 further comprising communicating with an IHS processor.

20. The method of claim 19 further comprising storing an operating system for the IHS in the first priority zone.

21. The method of claim 20 further comprising storing all of the operating system for the IHS in the first priority zone.

22. The method of claim 16 further comprising allowing use of the second priority zone after initialization of the second priority zone is complete.

23. The method of claim 16 wherein the first priority zone comprises different type solid state memory components than the second priority zone.

\* \* \* \* \*